(12) United States Patent  
Falkowski et al.

(10) Patent No.: US 9,115,638 B2  
(45) Date of Patent: Aug. 25, 2015

(54) GENSET ENGINE USING AN ELECTRONIC FUEL INJECTION SYSTEM INTEGRATING AN ALCOHOL SENSOR

(71) Applicant: CUMMINS POWER GENERATION, INC., Minneapolis, MN (US)

(72) Inventors: David T. Falkowski, Blaine, MN (US); Nick V. Halstead, Cedar, MN (US); Deborah A. Klinkert, Plymouth, MN (US); Matthew J. Ethen, New Brighton, MN (US); Luke R. Staples, St. Louis Park, MN (US)

(73) Assignee: Cummins Power Generation, Inc., Minneapolis, MN (US)

( * ) Notice: Subject to any disclaimer, the term of this patent is extended or adjusted under 35 U.S.C. 154(b) by 378 days.

(21) Appl. No.: 13/663,585

(22) Filed: Oct. 30, 2012

(65) Prior Publication Data

US 2013/0061833 A1 Mar. 14, 2013

Related U.S. Application Data

(63) Continuation-in-part of application No. 12/695,406, filed on Jan. 28, 2010, now Pat. No. 8,322,327.

(51) Int. Cl.
*F02B 15/00* (2006.01)
*F02D 41/30* (2006.01)
(Continued)

(52) U.S. Cl.
CPC .............. *F02B 15/00* (2013.01); *F02D 19/084* (2013.01); *F02D 19/087* (2013.01); *F02D 29/06* (2013.01);
(Continued)

(58) Field of Classification Search
CPC . F02D 41/064; F02D 41/187; F02D 41/1454; F02D 19/084; F02D 19/087; F02D 29/06; F02B 15/00
USPC ......... 123/1 A, 27 GE, 525, 198 A, 575, 431, 123/704, 466; 701/103–105, 109; 73/114.31, 114.38
See application file for complete search history.

(56) References Cited

U.S. PATENT DOCUMENTS 4,993,391 A 2/1991 Kuribara et al.
5,056,490 A 10/1991 Kashima
(Continued)

OTHER PUBLICATIONS

Open Loop and Closed Loop (with English Translation), Journal Editorial Office of Auto Driving & Service, Auto Driving & Service, vol. 9, p. 59, Sep. 3, 2001, 3 pages.

*Primary Examiner* — Hai Huynh
(74) *Attorney, Agent, or Firm* — Foley & Lardner LLP (57) ABSTRACT

A genset system that includes a genset assembly, an electronic fuel injection (EFI) system and an alcohol sensor and a method of controlling air-to-fuel ratio using the genset system are described. The genset assembly includes a genset engine that (1) is capable of running on at least one of gasoline and alcohol, (2) is an air-cooled engine, and (3) operates at a rich air-to-fuel ratio (AFR). The EFI system includes an electronic control unit that is configured to determine a requested AFR based on the data from the alcohol sensor and the data from the air flow sensor, and based on the determined requested relative AFR, the electronic control unit is configured to actuate the fuel injector such that the fuel in an amount sufficient for obtaining an air/fuel mixture that is at the determined requested relative AFR is injected into the intake system.

15 Claims, 4 Drawing Sheets

(51) Int. Cl.
*F02D 41/06* (2006.01)
*F02D 19/08* (2006.01)
*F02D 41/00* (2006.01)
*F02D 29/06* (2006.01)
*F02D 41/14* (2006.01)
*F02D 41/18* (2006.01)

(52) U.S. Cl.
CPC ......... *F02D 41/0025* (2013.01); *F02D 41/064* (2013.01); *F02D 41/1454* (2013.01); *F02D41/187* (2013.01); *F02D 2200/0611* (2013.01); *Y02T 10/36* (2013.01)

(56) References Cited

U.S. PATENT DOCUMENTS

| | | | |
|---|---|---|---|
| 5,131,228 A | | 7/1992 | Mochizuki et al. |
| 5,150,301 A * | | 9/1992 | Kashiwabara et al. ....... 701/106 |
| 5,197,450 A * | | 3/1993 | Kitajima et al. ............... 123/685 |
| 5,363,314 A * | | 11/1994 | Kobayashi et al. ............. 702/25 |
| 5,456,234 A | | 10/1995 | Kodama et al. |
| 8,322,327 B2 * | | 12/2012 | Falkowski et al. ............ 123/575 |
| 2009/0210138 A1 | | 8/2009 | Hokuto et al. |
| 2009/0283078 A1 | | 11/2009 | Okubo |
| 2010/0012081 A1 | | 1/2010 | Ashizawa |

\* cited by examiner

GENSET ENGINE USING AN ELECTRONIC FUEL INJECTION SYSTEM INTEGRATING AN ALCOHOL SENSOR

This application is a continuation-in-part application of pending application Ser. No. 12/695,406, filed on Jan. 28, 2010, entitled A GENSET ENGINE USING AN ELECTRONIC FUEL INJECTION SYSTEM INTEGRATING AN ALCOHOL SENSOR, the entire contents of which are incorporated herein by reference.

FIELD

This disclosure relates to a genset system that includes an electronic fuel injection system, a genset assembly and an alcohol sensor. The alcohol sensor sends signals to an electronic control unit (ECU) which in turn controls the fuel/air mixture to reach the operative air-to-fuel ratio (AFR) resulting in improved and efficient engine performance. The alcohol sensor sends signals regarding the type of fuel that is being used to further control the AFR allowing for different fuel blends to be used within the same genset assembly while maintaining optimal engine performance and efficiency.

BACKGROUND

In general, fuel injection systems mix fuel with air in internal combustion engines. Fuel is forcibly pumped through a fuel injector resulting in atomization of the fuel which is then mixed with air and is either indirectly or directly placed in the combustion chamber. The fuel/air ratio must be precisely controlled to achieve desired engine performance, emissions, and fuel economy. Fuel injection systems react to changing inputs, where the inputs are data provided by various sensors, by controlling the amount of fuel injected.

Figure 1:
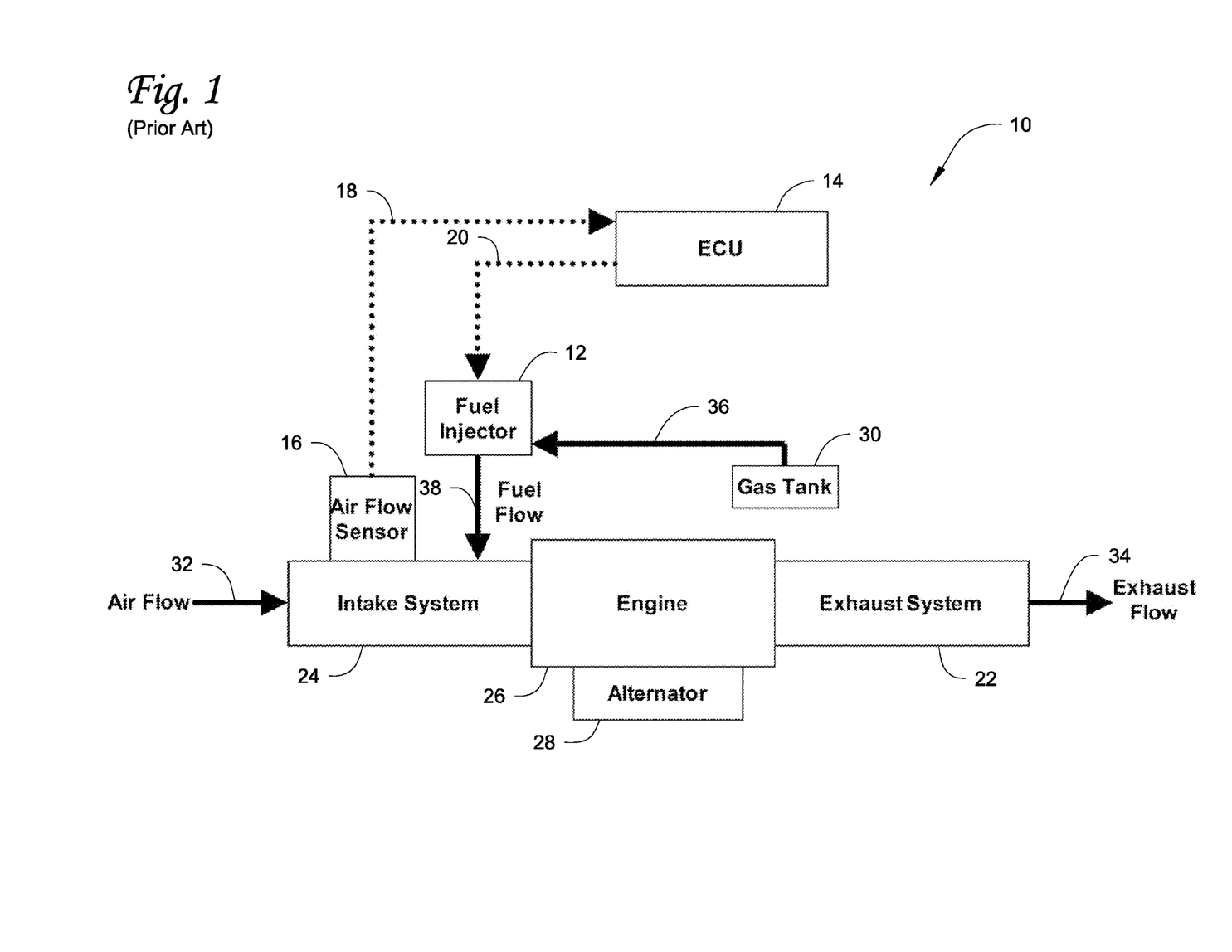
FIG. 1 illustrates a conventional open loop EFI system.

An example of a known open loop electronic fuel injection (EFI) system is illustrated in FIG. 1. The open loop EFI system 10 is comprised of a fuel injector 12, an electronic control unit (ECU) 14, an air flow sensor 16, communication circuitry 18 linking the ECU 14 and the air flow sensor 16 and communication circuitry 20 linking the ECU 14 and the fuel injector 12. Other known components that are sometimes used in such systems, but are not shown in FIG. 1, include a fuel pump, a fuel pressure regulator, other input sensors, which may include but are not limited to, a hall effect sensor, a manifold absolute pressure (MAP) sensor, a throttle position sensor, a coolant temperature sensor, an oil temperature sensor, and a manifold air temperature (MAT) sensor.

Figure 2:
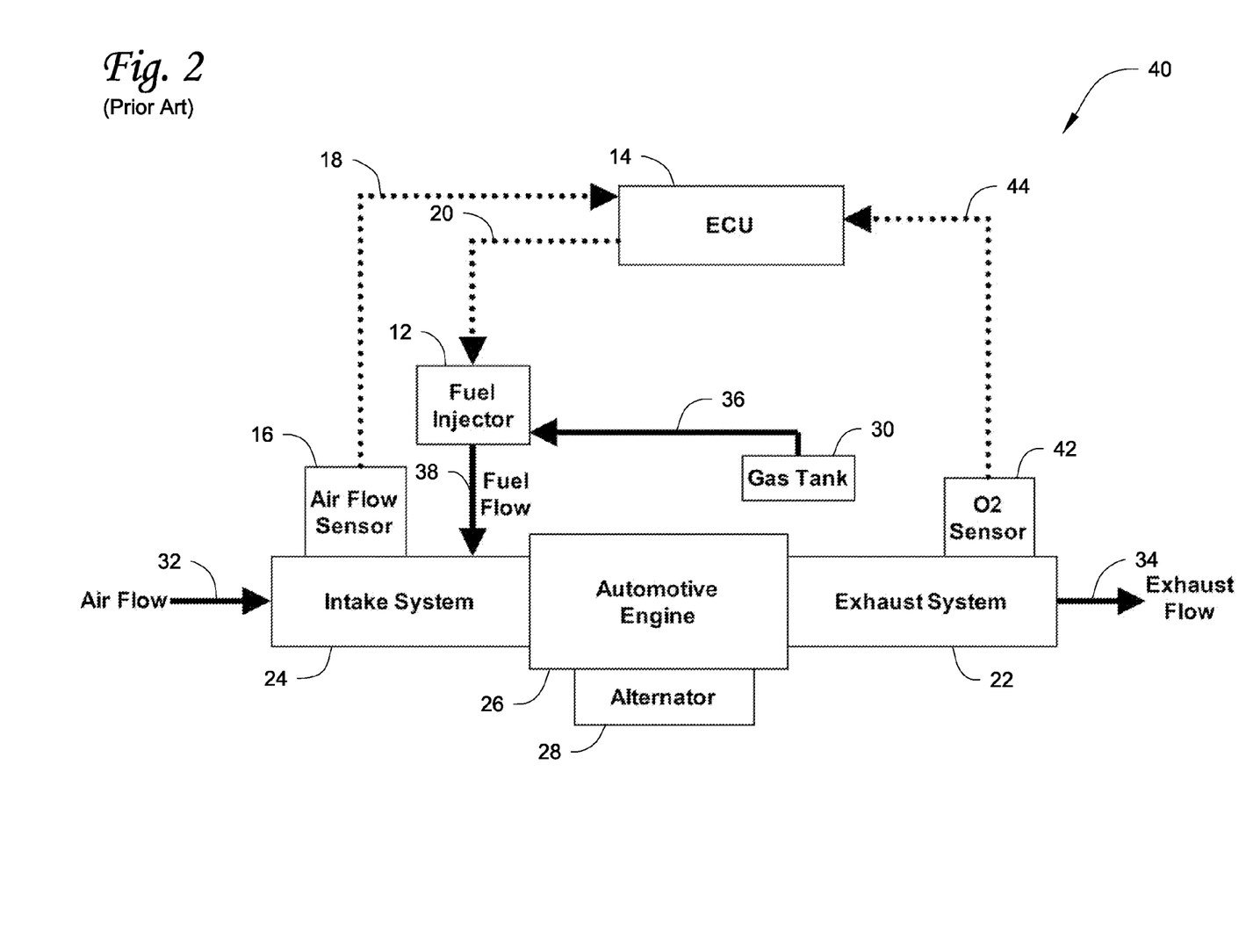
FIG. 2 illustrates a conventional closed loop EFI system.

A known closed loop EFI system is illustrated in FIG. 2. The components of the closed loop EFI system 40 are generally the same as that of the open loop EFI system 10 except for the addition of an oxygen sensor 42 located in the exhaust system 22. Communication circuitry 44 links the ECU 14 and the oxygen sensor 42.

Other common features of the engine systems shown in FIGS. 1 and 2 include an exhaust system 22, an intake system 24, the engine 26, an alternator 28, and a gas tank 30. Air flow 32 enters at the intake system 24 and exhaust flow 34 exits at the exhaust system 22. Fuel 36 moves from the gas tank 30 to the fuel injector and is atomized. The atomized fuel 38 enters the intake system.

In an open loop EFI system 10 (e.g., FIG. 1), an air flow sensor 16 (or other sensor(s) such as a MAP or MAT) senses the mass of air that flows past it and transmits this data to the ECU 14. The ECU 14 uses this data, along with the requested relative AFR to provide the correct fuel flow that will provide acceptable engine performance. The requested relative AFR is typically determined from a lookup table using various sensor input data, for example, sensor input data from an oil temperature sensor, from an engine speed sensor, or from other available sensors. The ECU 14 electrically actuates the fuel injector 12 so that the atomized fuel 38 mixes with the air flow 32 to reach the requested relative AFR as provided in the look-up table. Open loop EFI systems 10 do not receive any feedback as to whether the correct AFR is being achieved. The AFR may be incorrect due to degradation of the fuel injector 12, the air flow sensors 16 may be out of tolerance, etc. While an open loop EFI 10 is a lower cost system, the engine may not meet performance and emission requirements since there is not sufficient air/fuel mixture control to enable effective exhaust catalysis, resulting in unacceptable system performance. In general, engines that operate with strictly open loop EFI systems 10 are not used in automobiles, do not operate on fuel blends and are made to operate using only one grade, type or blend of fuel.

A closed loop EFI system 40 (e.g., FIG. 2), works in much the same way as the open loop EFI system 10 except for the addition of the oxygen sensor 42. The oxygen sensor 42 senses the amount of oxygen in the exhaust gas after combustion which is an indicator of whether the AFR is too lean or too rich for optimum combustion. Data regarding the oxygen levels is transmitted to the ECU 14, along with information from other sensors that may be available. The data is processed to determine the AFR so that the ECU 14 can thereby actuate the fuel injector 12 to adjust the amount of atomized fuel 38 injected, so that the air/fuel mixture matches the requested AFR.

During full throttle conditions, on initial start-up, or during a transient occurrence (such as a load suddenly applied to the engine) the ECU 14 may ignore inputs from the oxygen sensor 42, thereby mimicking an open loop state, so that the engine 26 can meet the required performance by running a richer mixture. In the case of initial startup, inputs from the oxygen sensor 42 may be ignored during the start-up phase until appropriate operating temperatures are reached, wherein the time from start-up to oxygen sensor 42 input reading can be delayed from several seconds to a couple of minutes, resulting in non-optimal engine performance. Closed loop EFI systems are known in the automotive industry.

In addition, some closed loop EFI systems 40 in the automotive industry incorporate alcohol sensors. This allows automobiles to operate on various blends of gasoline and ethanol, and also operate in the event the alcohol content is varied, for example, if ethanol is put into a tank that still contains gasoline. In general, fuel is added to the tank after the automobile is driven to a fueling station. In such a case, the oxygen sensors and alcohol sensors are typically operating in a hot or warm re-starting state, rather than a cold re-starting state of the engine, and adjustments to the AFR are done fairly quickly with a minimum of performance and efficiency issues. Engines that operate on fuels that have a wide range of ethanol and gasoline blends use closed loop control, with or without alcohol sensors, to provide the correct fueling so that the AFR is attained for acceptable performance.

However, it is not known in the automotive industry or in other engine applications to incorporate alcohol sensors into an open loop EFI system where different grades or types of fuels may be blended and used. There is a need for an open loop EFI system that incorporates alcohol sensors for other engine types, i.e., genset engines.

SUMMARY

A genset system that includes a genset assembly, an electronic fuel injection (EFI) system and an alcohol sensor and a method of controlling air-to-fuel ratio using the genset system are described. In some embodiments, the genset system described herein can be used in non-automotive applications such as heating and cooling applications, and recreational vehicles (RVs).

The genset assembly generally includes an engine that is capable of running on fuel that includes gasoline and/or alcohol, a generator that is driven by the engine and an intake system that receives air and is in fluid communication with the engine.

In one embodiment, the engine in the genset system is an air-cooled engine. Air-cooled engines are distinguishable from liquid-cooled engines in that the former is cooled by air, as opposed to a liquid as in their liquid cooled counterparts. In some examples, the genset system is configured so that the engine operates at a rich air-to-fuel ratio. The term "rich AFR" means that the ratio of air to fuel is such that there is excess fuel and no oxygen after combustion.

The EFI system includes an alcohol sensor that measures the amount of alcohol in the fuel that is supplied to the fuel injector from a fuel tank, a fuel injector that injects the fuel into the intake system so as to form an air/fuel mixture within the intake system, an electronic control unit, and an air flow sensor that measures an air flow of the intake system.

The genset assembly is integrated with the EFI system such that the electronic control unit and the alcohol sensor are linked with a first communication circuitry, the electronic control unit and the fuel injector are linked with a second communication circuitry, and the electronic control unit and the air flow sensor are linked with a third communication circuitry.

The electronic control unit is configured to determine a requested relative air to fuel (AFR) ratio based on the data from the alcohol sensor and the data from the air flow sensor. The requested relative AFR is a ratio of the actual AFR to a stoichiometric AFR. Based on the determined requested relative AFR, the electronic control unit is configured to actuate the fuel injector via the second communication circuitry such that fuel in an amount sufficient for obtaining an air/fuel mixture that is at the determined requested relative AFR is injected into the intake system.

DETAILED DESCRIPTION

Generally, genset engines that are (1) capable of running on gasoline, alcohol or alcohol-blended gasoline and (2) cooled only by air are operated at rich air-to-fuel ratios for the purposes of engine part durability and genset stability. That is, operating at a rich air-to-fuel ratio can lead to a more stable combustion on a cycle-to-cycle basis, thereby allowing the speed of the engine to be held constant (e.g., 60 Hz) and the torque to be responsive when requested by the user. Operating at a rich air-to-fuel ratio also can generally lead to lower combustion temperatures and improved cooling from the excess fuel. In addition, air-cooled engines depend more on a richer fueling for thermal management since air-cooled engines are typically not as thermally stable as their liquid-cooled counterparts.

Engine part durability and genset stability are generally required in order to meet emissions requirements, such as those under the Environmental Protection Agency (EPA). In general, air-cooled genset engines in an open-loop genset system that are capable of running on gasoline, alcohol or alcohol-blended gasoline can meet emissions requirement where fuel having a gasoline to alcohol ratio required by a particular engine for emissions compliance is used every time the genset engine is operated.

However, in practice, the gasoline to alcohol ratio in fuel that is supplied to the system can typically vary widely due to various reasons such as variability in the fuel suppliers. For example, fuel that was last supplied to the genset engine could be 80% ethanol, whereas the fuel that is used to start from the cold state could be 20% ethanol. In this instance, an open-loop genset system may not be able to account for the differences in fuel characteristics in terms of emissions performance, at which point the emissions of the genset engine may go out of compliance depending on the regulations.

If fuel that does not have the required gasoline to alcohol ratio is supplied to the open-loop genset system, then the engine may operate at a lean air-to-fuel ratio (the term "lean AFR" means that the ratio of air to fuel is such that there is excess oxygen and no fuel after combustion). That is, fuel having a variable alcohol content may have a lower density than that of fuel having the required gasoline to alcohol ratio and may become oxygenated by an oxygenator, namely alcohol, that is present in increased amounts in the fuel. This can lead to the genset engine becoming inoperable. Moreover, even where the alcohol content is not increased to the point where the alcohol content is not high enough to trigger inoperability, the genset engine can still encounter durability issues since the engine still would not be running on fuel with the required air-to-fuel ratio, which can lead to the engine running outside the conditions that the engine was designed for, for example, running at higher temperatures and at leaner air-to-fuel ratios.

Applicants have found that the data from an alcohol sensor and air flow sensor can be used to operate a genset engine that (1) is capable of running on gasoline, alcohol or alcohol-blended gasoline and (2) is cooled only by air at rich air-to-fuel ratios. That is, it is generally accepted that a genset system that include a genset engine that (1) is capable of running on gasoline, alcohol or alcohol-blended gasoline and (2) is cooled only by air, cannot rely on data from the alcohol sensor, the air flow sensor and/or a standard-type $O_2$ sensor (also known as a switching sensor; this sensor typically has an output that switches between rich and lean operation) to operate at a rich air-to-fuel ratio. Rather, such genset systems would require a wide-band $O_2$ sensor instead of the switching sensor in order to calculate the required amount of fuel to be injected so as to operate at the correct air-to fuel ratio. However, wide-band $O_2$ sensors can be expensive. On the other hand, alcohol sensors typically cost substantially less than wide-band $O_2$ sensors.

Moreover, in order for the wide-band $O_2$ sensors to produce an accurate output, the $O_2$ sensors must come up to temperature in the exhaust stream, even where an internal electric heater that is included in some wide-band $O_2$ sensors is used. Thus, an accurate output is usually not available at start-up from the wide-band $O_2$ sensor. As a consequence, the correct amount of fuel may not be provided to the engine at start-up. This can cause the genset engine to shut down and flag a service event because the genset engine cannot maintain the desired frequency stability.

On the other hand, alcohol sensors can provide reliable data relatively quickly at start-up. Applicants have found that the data from the alcohol sensor can be used together with the data from the air flow sensor, for example, at start-up to provide the engine with a fuel mixture having an AFR that is required by the genset engine for genset durability and stability so that the genset engine can start and operate at the correct air-to-fuel ratio from a coldstate. Details of the embodiments of the present invention follow.

Figure 3:
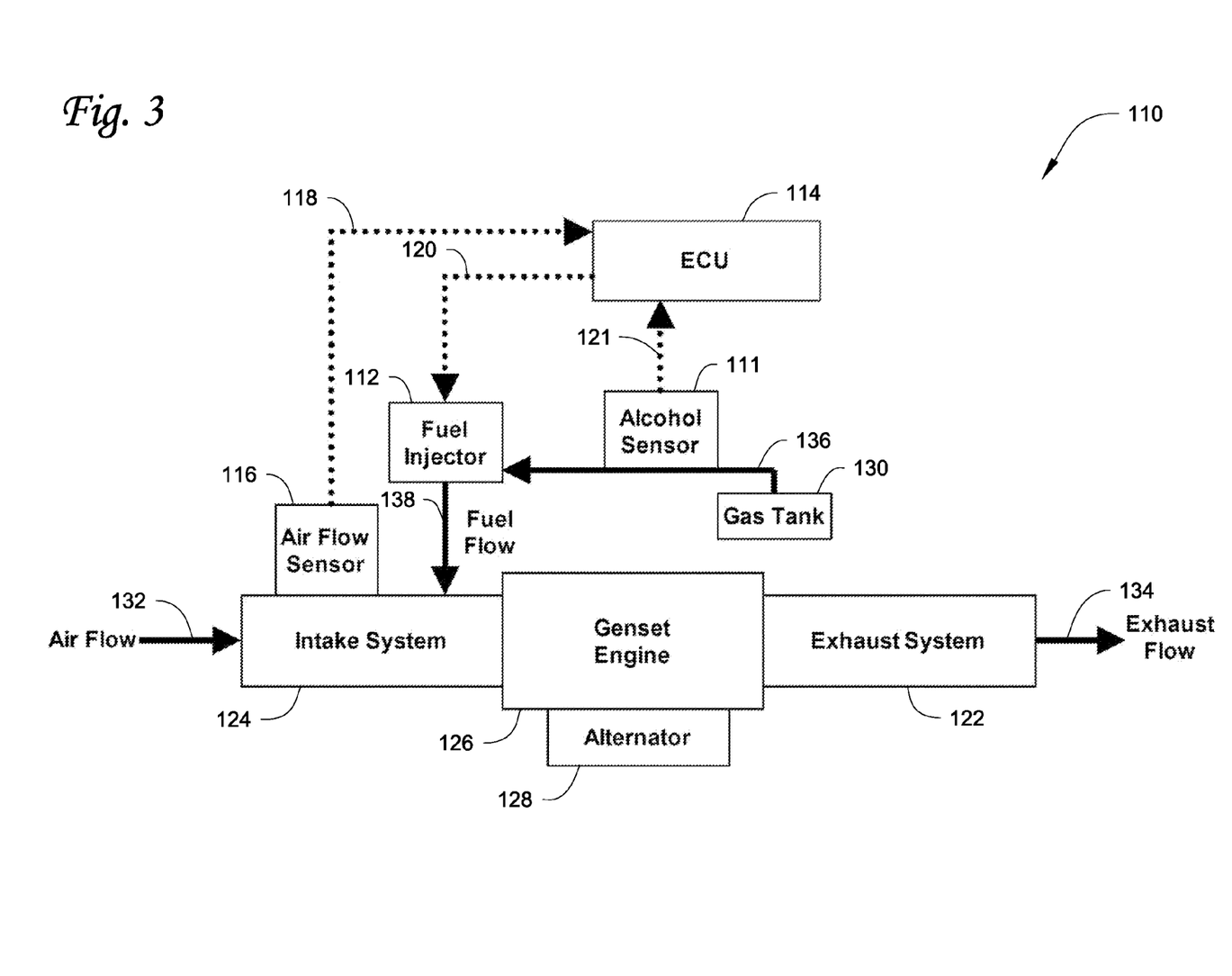
FIG. 3 illustrates a schematic of an open loop EFI system with an alcohol sensor.

An embodiment of an open loop EFI genset system 110 is shown in FIG. 3. The open loop EFI genset system 110 is comprised of a genset assembly and an EFI system. The genset assembly includes a genset engine 126, an alternator 128 that is driven by the engine, an intake system 124 and an exhaust system 122. The EFI system includes a fuel injector 112, an electronic control unit (ECU) 114, an air flow sensor 116 and an alcohol sensor 111. The genset assembly is integrated with the EFI system via a communication circuitry 118 linking the ECU 114 and the air flow sensor 116, communication circuitry 120 linking the ECU 114 and the fuel injector 112, and communication circuitry 121 linking the ECU 114 and the alcohol sensor 111.

Other known components sometimes used in such systems, but not shown in FIG. 3, include for example a fuel pump, a fuel pressure regulator, and other input sensors. Such sensors may include but are not limited to for example, a hall effect sensor, a manifold absolute pressure (MAP) sensor, a throttle position sensor, a coolant temperature sensor, an oil temperature sensor, engine speed sensor, and a manifold air temperature (MAT) sensor. FIG. 3 also shows features of the genset system 110 that includes a gas tank 130.

In one example, the engine 126 is an engine that (1) is capable of running on gasoline, alcohol or alcohol-blended gasoline, (2) is cooled only by air and (3) operates at a rich air-to-fuel ratio.

During operation, air flow 132 enters at the intake system 124 and exhaust flow 134 exits at the exhaust system 122. Fuel 136 moves from the gas tank 130 to the fuel injector 112 and is atomized. The atomized fuel 138 enters the intake system 124.

The ECU 114 is the system computer and monitors engine operating parameters via various input sensors that are employed. The ECU 114 contains look-up tables or algorithms used to determine the requested relative air-to-fuel ratio (AFR). The stoichiometric AFR is a function of fuel composition and is the mass ratio of air to fuel in which there is not excess air or excess fuel after combustion. The ECU 114 uses the data from the sensors to determine the requested relative AFR which is the ratio of the actual AFR to the stoichiometric AFR and sends a signal to the fuel injector 112 to open it at a specific time and for a specific length of time based on the determined requested relative AFR.

The term "stoichiometric AFR" means a ratio of air to fuel such that "there is just enough oxygen for conversion of all the fuel into completely oxidized products". (see, e.g., John B. Heywood, "Internal Combustion Engine Fundamentals", McGraw-Hill, 1988). The term "actual AFR" means the ratio of the air to fuel that is delivered to the cylinder prior to combustion during operation.

In some examples, the requested relative AFR can be used with the stoichiometric AFR to determine the actual AFR that is going to be supplied for combustion, and can be defined by the following equation (1):

$$\text{actual AFR} = \text{requested relative AFR} * \text{stoichiometric AFR} \quad (1).$$

In some instances, the stoichiometric AFR of a certain engine may be predetermined for a certain fuel. In a certain instance, the stoichiometric AFR value can be 14.7. In this instance, the algorithm can utilize a constant for the 14.7 value of the stoichiometric AFR. In some examples, the constant can be the requested relative AFR. The corresponding constant value can be, for example, 0.8 where the stoichiometric AFR value is 14.7. Inserting 14.7 for "stoichiometric AFR" and inserting 0.8 for "requested relative AFR" in equation (1) gives the following:

$$\text{actual AFR} = 14.7 * 0.8 = 11.76.$$

Thus, in the above instance, the actual AFR would be 11.76. In this example, the fuel injector 112 would be opened at a specific time and for a specific length of time to achieve the calculated actual AFR.

In some instances, the requested relative AFR does not need to be a constant and can vary depending on other parameters. In some instances, one of the parameters can be the oil temperature, and the algorithm can be set up so that the input to the requested relative AFR is a function of the oil temperature. In one implementation, if the oil temperature is less than 0 degrees Celsius, then the requested relative AFR can be 0.7. Otherwise, the requested relative AFR can be 0.8.

To have the genset engine 126 start and operate at the requested relative AFR ratio in the calibration, the ECU 114 determines the amount of fuel that is needed and the ECU 114 actuates the fuel injector 112 to release fuel so that the fuel can mix with the air flow to reach the requested relative AFR.

In one embodiment, the fuel injector 112 is an electromechanical valve that provides metering of the fuel into the genset engine 126. The fuel injector 112 is normally closed, and opens to inject pressurized fuel for a specified length of time. The fuel injector 112 atomizes the fuel by forcibly pumping the fuel through a small nozzle under high pressure and, in one embodiment, the atomized fuel 138 is mixed with the air flow 132 in the intake system 124 of the genset engine 126. In another embodiment, the atomized fuel 138 and air flow 132 are mixed in the combustion area of the genset engine 126. The ECU 114 sends signals to the fuel injector 112 via communication circuitry 120.

The alcohol sensor 111 senses the amount of alcohol in the fuel 136 that is to be supplied to the fuel injector 112 and this information is transmitted to the ECU 114 via communication circuitry 121. The alcohol sensor 111 may also provide information on fuel density, viscosity and the dielectric constant, which helps to determine the correct amount of requested fuel even more accurately. For example, the fuel 136 may range from gasoline (0% ethanol), ethanol-blended gasoline to 100% ethanol. The alcohol sensor 111 can be disposed in or on the gas tank 130 or the fuel lines or other part that has fuel.

The air flow sensor 116 measures the air intake of the genset engine 126. Air flow is determined by either the mass airflow or the speed density. The airflow measurement is sent as data to the ECU 114 via communication circuitry 118. In one embodiment, the air flow sensor 116 is disposed on the intake system 124 of the genset engine 126. In other embodiments, a manifold absolute pressure (MAP) sensor and/or a manifold air temperature (MAT) sensor, or any combination of an air flow sensor, MAP sensor, and MAT sensor, can be used to determine mass airflow and/or speed density.

In the embodiment shown in FIG. 3, as the genset engine 126 is being started, for example from a cold state, the air flow sensor 116 senses the mass of air that flows past the air flow sensor 116 and transmits this data to the ECU 114. The alcohol sensor 111 senses the level of alcohol in the fuel and transmits this data to the ECU 114. Other sensors that may be available also send information to the ECU 114. The ECU 114 uses the data supplied from the alcohol sensor 111 and also from the air flow sensor 116, as well as any other data from other available sensors, to determine the requested relative AFR ratio (i.e., ratio of the actual AFR to the stoichiometric AFR). The requested relative AFR is a value set in the look-up table that will provide acceptable genset engine 126 performance based on the given parameters.

To have the genset engine 126 start and operate at the requested relative AFR ratio in the calibration, the ECU 114 uses the air flow 132 information, the fuel 136 composition information (e.g. alcohol content), and the requested relative AFR ratio to determine the amount of fuel 136 that is needed at a cold start and normal operating conditions. The ECU 114 electrically actuates the fuel injector 112 to inject fuel 138 to be mixed with the air flow 132 in a ratio to thereby reach the relative AFR.

It is preferable that upon starting, accurate readings are obtained in less than a second and in no more than two seconds because the quicker the data is provided to the ECU 114, the more accurate the fuel that is delivered and the sooner that acceptable performance is achieved. In another embodiment, accurate readings are obtained at least within a few seconds. Once the genset engine 126 is running, the sensors 111, 116 continuously monitor and send data to the ECU 114 so that real-time adjustments are made to the AFR and the genset engine 126 runs at its optimal performance. Real-time adjustments are adjustments that are done almost instantly upon receiving input data. For example, a real-time adjustment would occur if the ECU 114 sensed a load change during an engine cycle and then changed the fuel delivered to the engine in the very next cycle. An adjustment that takes several seconds, and several cycles, would not be adjusted in real-time. An example of this would be if a Fast Fourier Transform, which is a complicated algorithm, were being used in the ECU 114 on the input from a knock sensor to determine if the genset was running properly. This calculation takes several seconds, which is a relatively large amount of time compared to an engine cycle, and the calculation must complete before the ECU 114 can take action. Thus, the adjustment would not be in real-time. In another embodiment, the genset engine 126 can be hot re-started without any degradation in performance. In another embodiment, the genset engine 126 can have an additional load placed on it and the open loop EFI system 110 will adjust without any loss of performance.

Closed loop genset systems also can benefit from alcohol sensors. That is, as indicated above, in practice, the gasoline to alcohol ratio in fuel that is supplied to the system can typically vary widely due to various reasons such as variability in the fuel suppliers. This fuel variability can cause stability and durability problems in engines included in closed loop genset systems. This is because $O_2$ sensors that are included in closed-loop genset systems cannot provide accurate data immediately at start-up, and as such, the correct fuel mixture may not be provided to the engine at start-up. This can cause the genset engine to shut down and flag a service event because the genset engine cannot maintain the desired frequency stability.

Figure 4:
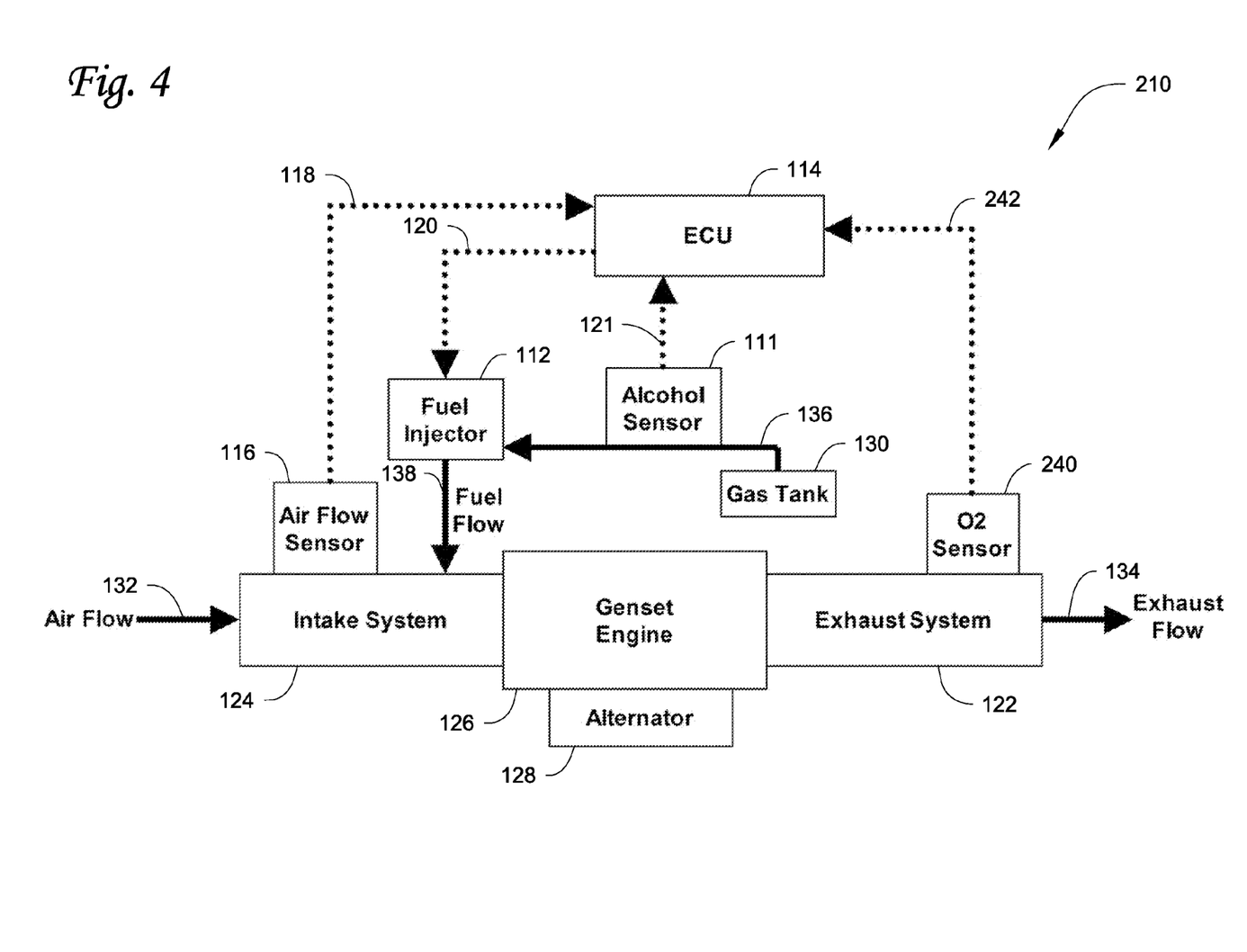
FIG. 4 illustrates a schematic of a closed loop EFI system with an alcohol sensor.

An embodiment of a closed loop EFI genset system 210 is shown in FIG. 4. The closed loop EFI genset system 210 includes a genset assembly and an EFI system. The genset assembly includes the genset engine 126, the alternator 128 that is driven by the engine, the intake system 124 and the exhaust system 122. The EFI system includes the fuel injector 112, the electronic control unit (ECU) 114, the air flow sensor 116 and the alcohol sensor 111. The EFI system further includes an oxygen sensor 240. The genset assembly is integrated with the EFI via a communication circuitry 242 linking the ECU 114 and the oxygen sensor 240, a communication circuitry 118 linking the ECU 114 and the air flow sensor 116, a communication circuitry 120 linking the ECU 114 and the fuel injector 112, and a communication circuitry 121 linking the ECU 114 and the alcohol sensor 111.

Other known components sometimes used in such systems, but not shown in FIG. 4, include a fuel pump, a fuel pressure regulator, other various input sensors, which may include, a hall effect sensor, a manifold absolute pressure (MAP) sensor, a throttle position sensor, a coolant temperature sensor, an oil temperature sensor, an engine speed sensor, and a manifold air temperature (MAT) sensor. FIG. 4 also shows features of the genset engine system 210 that include the gas tank 130.

In one example, the engine 126 is an engine that (1) is capable of running on gasoline, alcohol or alcohol-blended gasoline, (2) is cooled only by air and (3) operates at a rich air-to-fuel ratio.

During operation, air flow 132 enters at the intake system 124 and exhaust flow 134 exits at the exhaust system 122. Fuel 136 moves from the gas tank 130 to the fuel injector 112 and is atomized. The atomized fuel 138 enters the intake system 124.

The ECU 114 is the system computer and monitors engine operating parameters via various input sensors that are employed. The ECU 114 contains look-up tables or algorithms used to determine the requested relative air-to-fuel ratio (AFR). The stoichiometric AFR is a function of fuel composition and is the mass ratio of air to fuel in which there is not excess air or excess fuel after combustion. The ECU 114 uses the data from the sensors to determine the requested relative AFR, which is the ratio of the actual AFR to the stoichiometric AFR, and sends a signal to the fuel injector 112 to open it at a specific time and for a specific length of time to achieve the requested relative AFR. To have the genset engine 126 start and operate at the requested relative AFR ratio in the calibration, the ECU 114 determines the amount of fuel that is needed, at a cold start and during combustion or ongoing operation, and the ECU 114 actuates the fuel injector 112 to release fuel so that the fuel can mix with the air flow to reach the requested relative AFR.

The oxygen sensor 240 monitors the oxygen content of the exhaust flow 134 in the exhaust system 122. The oxygen sensor 240 reads the oxygen content of the exhaust gases after combustion and transmits this data to the ECU 114 via communication circuitry 242. The ECU 114 then determines if the amount of fuel provided is too rich or too lean for optimum combustion and adjusts the relative AFR accordingly. On starting, during transients, and under full throttle conditions, i.e. when there is maximum load on the genset engine 126, the inputs from the oxygen sensor 240 to the ECU 114 may be ignored by the ECU 114, resulting in the closed loop system mimicking an open loop system with an alcohol sensor 111, so that the engine 126 can reach acceptable performance by running a richer mixture. At a cold start-up, the oxygen sensor 240 inputs may be ignored by the ECU 114, for up to three minutes or longer until the oxygen sensor 240 reaches the operating temperature it needs to provide an accurate reading.

The fuel injector 112 is an electro-mechanical valve that provides metering of the fuel into the genset engine 126. The fuel injector 112 is normally closed, and opens to inject pressurized fuel for a specified length of time. The fuel injector 112 atomizes the fuel by forcibly pumping the fuel through a small nozzle under high pressure and, in one embodiment, the atomized fuel 138 is mixed with the air flow 132 in the intake system 124 of the genset engine 126. In another embodiment, the atomized fuel 138 and air flow 132 are mixed in the combustion area of the genset engine 126. The ECU 114 sends signals to the fuel injector 112 via communication circuitry 120.

The alcohol sensor 111 senses the relative amount of alcohol in the fuel 136 that is to be supplied to the fuel injector 112 and this information is transmitted to the ECU 114 via communication circuitry 121. The alcohol sensor 111 may also provide information on fuel density, viscosity and the dielectric constant, which helps to determine the correct amount of requested fuel even more accurately. For example, the fuel 136 may range from gasoline (0% ethanol) to 100% ethanol. The alcohol sensor 111 can be disposed, for example, in or on the gas tank 130 or the fuel lines or other part that has fuel.

The air flow sensor 116 measures the air intake of the genset engine 126. Air flow is determined by either the mass airflow or the speed density. The airflow measurement is sent as data to the ECU 114 via communication circuitry 118. In the embodiment shown, the air flow sensor 116 is disposed on the intake system 124 of the genset engine 126.

In the embodiment of a closed loop EFI system, as shown in FIG. 4, as the genset engine 126 is being started for example from a cold state, the air flow sensor 116 senses the mass of air 132 that flows past it and transmits this data to the ECU 114 and the alcohol sensor 111 senses the level of alcohol in the fuel and transmits this data to the ECU 114. The oxygen sensor 240 senses the oxygen content of the exhaust flow 134 but this data is ignored by the ECU 114 at cold state startup, effectively causing the closed loop EFI system 210 to run in an open loop configuration with an alcohol sensor 111 until the operating temperature of the oxygen sensor is reached. Other sensors that may be available may also send information to the ECU 114.

That is, at a start-up condition such as a cold startup, the ECU 114 temporarily ignores the data from the oxygen sensor 240 and uses the data supplied from the alcohol sensor 111 and the air flow sensor 116, as well as relevant data from other sensors that may be available, to determine the requested relative AFR ratio (i.e., the ratio of the actual AFR to the stoichiometric AFR). The term "temporarily ignores" means that the ECU does not use the data from the oxygen sensor 240 for a predetermined period of time in determining the requested relative AFR ratio. The requested relative AFR is a value set in the look-up table that will provide acceptable genset engine 126 performance based on the given parameters. The ECU 114 electrically actuates the fuel injector 112 so that the atomized fuel 138 mixes with the air flow 132 to reach the relative AFR. To have the genset engine 126 start and operate at the requested relative AFR ratio in the calibration, the ECU 114 uses the air flow 132 information, the fuel 136 composition information, information from other sensors, and the requested relative AFR ratio to determine the amount of fuel 136 that is needed, at a cold start and at combustion. The ECU 114 then actuates the fuel injector 112, such that atomized fuel 138 mixes with the air flow 132 to reach the requested relative AFR. In some examples, upon starting, accurate readings from the alcohol sensor are obtained in less than a second and in no more than 2 seconds. In other examples, upon starting, accurate readings from the alcohol sensor are obtained in a few seconds.

Once the genset engine 126 is running, the sensors 111, 116 continuously monitor and send data to the ECU 114, so that real-time adjustments are made to the AFR and the genset engine 126 runs at an acceptable level of performance, even without input from the oxygen sensor 240. Once the genset engine 126 has been running and the oxygen sensor 240 reaches its optimal operating temperature, its data is read by the ECU 114 and this information is read to fine-tune, add, or trim the amount of atomized fuel 138 that is injected, so that the actual AFR matches the requested relative AFR. By providing an alcohol sensor 111 on a closed loop EFI system 210 of a genset engine, the genset engine 126 can be run at optimal performance from a cold start, and is not reliant on the oxygen sensor 240 reaching its operational temperature in order to start with optimal performance.

It is known that gasoline has a stoichiometric AFR of about 14.6, whereas 100% ethanol has a stoichiometric AFR of about 9.0, which results in a wide band of relative AFR's that the genset engine 126 must be able to adapt to in order to run at acceptable performance. The genset engine 126 described herein is capable of operating within performance and emission requirements in this wide band and also with gasoline, alcohol or alcohol-blended fuels, due to its ability to sense the relative level of alcohol per the alcohol sensor 111, transmitting this data to the ECU 114 which subsequently controls the fueling to attain the requested AFR needed for acceptable performance.

As one example, an advantage is that the genset engine 126, open loop or closed loop, will be able to run on ethanol (E-85) fuel as well as other fuels and fuel blends. Another advantage is that the transient response of the genset engine 126 will be improved. The genset will have improved response to transient load steps, due to the comparison of multiple data inputs to the ECU 114.

The examples and embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A genset system comprising:
an engine that is capable of running on fuel that includes at least one selected from the group consisting of gasoline and alcohol;
a generator that is driven by the engine;
an intake system that receives air and is in fluid communication with the engine;
a fuel injector that injects the fuel into the intake system so as to form an air/fuel mixture within the intake system,
an electronic control unit,
an air flow sensor that measures an air flow of the intake system,
an alcohol sensor that measures the amount of alcohol in the fuel that is supplied to the fuel injector,
a first communication circuitry linking the electronic control unit and the alcohol sensor,
a second communication circuitry linking the electronic control unit and the fuel injector, and
a third communication circuitry linking the electronic control unit and the air flow sensor, and
wherein data from the alcohol sensor and air flow sensor are transmitted to the electronic control unit via the first and third communication circuitry,
wherein the electronic control unit is configured to determine a requested relative air to fuel ratio based on the data from the alcohol sensor and the data from the air flow sensor, the requested relative air to fuel ratio being a ratio of the actual air to fuel ratio to a stoichiometric air to fuel ratio, and based on the determined requested relative air to fuel ratio, the electronic control unit is configured to actuate the fuel injector via the second communication circuitry such that the fuel in an amount sufficient for obtaining an air/fuel mixture that is at the determined requested relative air to fuel ratio is injected into the intake system, wherein the engine provided with the air/fuel mixture that is at the determined requested relative air to fuel ratio is capable of starting and operating from a cold state, and wherein the engine is an air-cooled engine and operates at a rich air-to-fuel ratio.

2. The system of claim 1, wherein the alcohol sensor is disposed in or on a fuel tank from which fuel is supplied to the fuel injector.

3. The system of claim 1, wherein the alcohol sensor is disposed on a fuel line that connects the fuel injector and a fuel tank.

4. The system of claim 1, wherein the alcohol sensor is disposed in or on a part that contains fuel.

5. The system of claim 1, wherein the fuel is alcohol.

6. The system of claim 1, wherein the genset engine is provided in a recreational vehicle.

7. The system of claim 6, wherein the genset engine and the recreational vehicle are provided with a same fuel source.

8. The system of claim 1, wherein the genset engine is a stand-alone engine.

9. The system of claim 1, further comprising an oxygen sensor,
 a fourth communication circuitry linking the electronic control unit and the oxygen sensor, and
 wherein data from the oxygen sensor is transmitted to the electronic control unit via the fourth communication circuitry.

10. The system of claim 9, wherein the electronic control unit is configured to temporarily ignore data from the oxygen sensor until the oxygen sensor reaches an operative temperature.

11. The system of claim 9, wherein the data from the oxygen sensor is ignored by the electronic control unit when full throttle conditions exist.

12. A method of controlling air-to-fuel ratio in a genset engine comprising:
 integrating an electronic fuel injection system with a genset assembly that includes an engine that is capable of running on fuel that includes at least one selected from the group consisting of gasoline and alcohol, a generator that is driven by the engine and an intake system that receives air and is in fluid communication with the engine, wherein the engine is an air-cooled engine and operates at a rich air-to-fuel ratio, the electronic fuel injection system including an alcohol sensor that measures the amount of alcohol in the fuel that is supplied to the fuel injector from a fuel tank, a fuel injector that injects the fuel into the intake system so as to form an air/fuel mixture within the intake system, an electronic control unit, and an air flow sensor that measures an air flow of the intake system, such that the electronic control unit and the alcohol sensor are linked with a first communication circuitry, the electronic control unit and the fuel injector are linked with a second communication circuitry, and the electronic control unit and the air flow sensor are linked with a third communication circuitry, transmitting data from the alcohol sensor and data from the air flow sensor to the electronic control unit via the first and third communication circuitry, determining a requested relative air to fuel ratio based on the transmitted data from the alcohol sensor and the air flow sensor, the requested relative air to fuel ratio being a ratio of the actual air to fuel ratio to a stoichiometric air to fuel ratio; and actuating the fuel injector based on the determined requested relative air to fuel ratio via the second communication circuitry such that the fuel in an amount sufficient for obtaining an air/fuel mixture that is at the determined requested relative air to fuel ratio is injected into the intake system, wherein the engine provided with the air/fuel mixture that is at the determined requested relative air to fuel ratio is capable of starting and operating from a cold state.

13. The method of claim 12, further comprising transmitting data from an oxygen sensor to the electronic control unit via a fourth communication circuitry.

14. The method of claim 13, further comprising ignoring the data from the oxygen sensor until the oxygen sensor reaches an operative temperature.

15. The method of claim 13, further comprising ignoring the data from the oxygen sensor when a full throttle condition exists.

* * * * *